(12) United States Patent
Johnson et al.

(10) Patent No.: US 10,197,888 B2
(45) Date of Patent: Feb. 5, 2019

(54) COLLAPSIBLE LIGHT BOX

(71) Applicants: Aaron Johnson, Orem, UT (US); Kelly Beffrey, Petaluma, CA (US); Philip Beffrey, Petaluma, CA (US); Daniel B. Lyke, Petaluma, CA (US); Shane McKenna, Salt Lake City, UT (US)

(72) Inventors: Aaron Johnson, Orem, UT (US); Kelly Beffrey, Petaluma, CA (US); Philip Beffrey, Petaluma, CA (US); Daniel B. Lyke, Petaluma, CA (US); Shane McKenna, Salt Lake City, UT (US)

( * ) Notice: Subject to any disclaimer, the term of this patent is extended or adjusted under 35 U.S.C. 154(b) by 0 days.

(21) Appl. No.: 15/174,550

(22) Filed: Jun. 6, 2016

(65) Prior Publication Data

US 2016/0282705 A1    Sep. 29, 2016

Related U.S. Application Data

(63) Continuation-in-part of application No. 14/749,319, filed on Jun. 24, 2015, now Pat. No. 9,360,737.

(60) Provisional application No. 62/114,863, filed on Feb. 11, 2015, provisional application No. 62/016,521, filed on Jun. 24, 2014.

(51) Int. Cl.
    *G03B 15/00*    (2006.01)
    *G03B 15/06*    (2006.01)

(52) U.S. Cl.
    CPC .................................. *G03B 15/06* (2013.01)

(58) Field of Classification Search
    CPC ........ G03B 15/00; G03B 15/02; G03B 15/06; G03B 15/07

USPC ......................................................... 396/4, 1
See application file for complete search history.

(56) References Cited

U.S. PATENT DOCUMENTS

| | | | |
|---|---|---|---|
| 2,473,076 A * | 6/1949 | Scheibner | A01K 97/01 135/116 |
| 3,310,901 A | 3/1967 | Sarkisian | |
| 3,643,085 A | 2/1972 | Durand | |
| 4,490,776 A | 12/1984 | Kluch | |
| 5,094,188 A | 3/1992 | Wolak | |
| 5,311,409 A | 5/1994 | King | |
| 5,828,908 A | 10/1998 | Mauchan | |
| 6,672,737 B2 | 1/2004 | Lai et al. | |
| 6,948,826 B2 | 9/2005 | Fogerlie | |
| 7,055,976 B2 | 6/2006 | Blanford | |
| 7,396,148 B1 | 7/2008 | Tsai | |
| 7,431,251 B2 | 10/2008 | Carnevali | |
| 7,680,401 B1 | 3/2010 | Adelstein | |
| 2003/0193800 A1 | 10/2003 | Lai et al. | |

(Continued)

FOREIGN PATENT DOCUMENTS

CN    102423231    4/2012

*Primary Examiner* — Clayton E Laballe
*Assistant Examiner* — Fang-Chi Chang
(74) *Attorney, Agent, or Firm* — Kunzler, PC

(57) ABSTRACT

Apparatuses, systems, and methods are disclosed for a collapsible light box. An apparatus includes a substantially cube-shaped structure comprising a top side, a bottom side, a rear side, a left side, and a right side. An inside of the structure is accessible through a front side of the structure, which is open. An apparatus includes one or more joints located on each of the right side and the left side of the structure. The one or more joints allow the structure to collapse into a substantially flat shape. An apparatus includes one or more support elements providing support for the top side of the structure.

16 Claims, 10 Drawing Sheets

(56) References Cited

U.S. PATENT DOCUMENTS

| | | |
|---|---|---|
| 2003/0206735 A1 | 11/2003 | Saigo et al. |
| 2004/0042231 A1 | 3/2004 | Lai et al. |
| 2005/0243538 A1 | 11/2005 | Blanford |
| 2008/0079906 A1 | 4/2008 | Finn |
| 2008/0169923 A1 | 7/2008 | Belden et al. |
| 2008/0189188 A1 | 8/2008 | Morgenstern |
| 2008/0232115 A1* | 9/2008 | Tsai .......................... F21S 9/03 362/362 |
| 2010/0083170 A1 | 4/2010 | Lim et al. |
| 2011/0296294 A1 | 12/2011 | Bhadury et al. |
| 2011/0317394 A1 | 12/2011 | Campen |
| 2012/0023669 A1 | 2/2012 | Graller et al. |
| 2012/0087643 A1 | 4/2012 | Paramadilok |
| 2012/0290979 A1 | 11/2012 | Devecka |
| 2013/0035995 A1 | 2/2013 | Patterson et al. |
| 2013/0346172 A1 | 12/2013 | Wu |
| 2014/0101197 A1 | 4/2014 | Charytoniuk |
| 2014/0122201 A1 | 5/2014 | Johnson |

* cited by examiner

COLLAPSIBLE LIGHT BOX

CROSS-REFERENCES TO RELATED APPLICATIONS

This application claims the benefit of U.S. Provisional Patent Application No. 62/016,521 entitled "COLLAPSIBLE LIGHT BOX" and filed on Jun. 24, 2014 for Aaron Johnson, which is incorporated herein by reference. This application also claims the benefit of U.S. Provisional Patent Application No. 62/114,863 entitled "COLLAPSIBLE LIGHT BOX" and filed on Feb. 11, 2015 for Aaron Johnson, which is incorporated herein by reference. This application also claims the benefit of U.S. patent application Ser. No. 14/749,319 entitled "COLLAPSIBLE LIGHT BOX" and filed on Jun. 24, 2015, which is incorporated herein by reference.

FIELD

This invention relates to photography and more particularly relates to a collapsible light box that can be used for photography.

BACKGROUND

A light box is a structure that a photographer can use to provide enhanced, directed, or diffused lighting for items within the light box, which allows the photographer to capture images of the item using different lighting effects. For example, a retailer can take images of products placed within the light box to enhance the detail of the product for an online store or product catalog. Similarly, a restaurant owner may take images of food items placed within the light box for an online or paper menu.

SUMMARY

An apparatus for a collapsible light box is disclosed. A system and method also perform the functions of the apparatus. In one embodiment, an apparatus includes a substantially cube-shaped structure comprising a top side, a bottom side, a rear side, a left side, and a right side. In certain embodiments, an inside of a structure is accessible through an open front side of the structure. An apparatus may also include one or more joints located on each of a right side and a left side of a structure. The one or more joints may allow a structure to collapse into a substantially flat shape. An apparatus, in some embodiments, includes one or more support elements providing support for a top side of a structure.

In one embodiment, one or more support elements include a first elongate shaft and a second elongate shaft. In some embodiments, a first elongate shaft is located proximate to a left side near a front side of a structure, and a second elongate shaft is located proximate to a right side near a front side of a structure. In a further embodiment, first and second elongate shafts are rotatably coupled to a bottom side of a structure at a first end.

In some embodiments, an apparatus includes a first support fasten mechanism and a second support fasten mechanism located on a top side of a structure at locations opposite locations where first and second elongate shafts are coupled to the structure. The first and second support fasten mechanisms may secure each of first and second elongate shafts at a second end when a structure is un-collapsed. In various embodiments, an apparatus includes a first retaining member and a second retaining member located on a bottom side of the structure that may secure first and second elongate shafts when a structure is collapsed.

In one embodiment, first and second support fasten mechanisms secure each of first and second elongate shafts using one or more of a friction fit, a snap fit, and a magnet. In some embodiments, first and second elongate shafts are rotatably coupled to a top side of the structure at a first end. In various embodiments, an apparatus includes a first support fasten mechanism and a second support fasten mechanism located on a bottom side of a structure at locations opposite locations where first and second elongate shafts are coupled to the structure. The first and second support fasten mechanisms securing each of first and second elongate shafts at a second end when a structure is un-collapsed.

In certain embodiments, first and second elongate shafts comprise telescoping structures such that each of the first and second elongate shafts are extendable and collapsible. In some embodiments, one or more support elements comprise one or more joint support structures. The one or more joint support structures may be coupled to one or more joints located on left and right sides of a structure.

In one embodiment, a joint support structure includes a first locking member coupled to a first half of a joint and a second locking member coupled to a second half of the joint corresponding to the first half of the joint. The first locking member may engage the second locking member to lock a joint in a fixed position in response to a structure being un-collapsed. In various embodiments, one or more support elements are detachable from a structure.

A system in one embodiment, includes a power supply and a substantially cube-shaped structure comprising a top side, a bottom side, a rear side, a left side, and a right side. In certain embodiments, an inside of a structure is accessible through an open front side of a structure. A system, in a further embodiment, includes one or more lighting elements disposed within a structure that illuminate an inside of the structure. A system may include one or more joints located on each of a right side and a left side of a structure. One or more joints may allow a structure to collapse into a substantially flat shape. In some embodiments, a system includes one or more support elements providing support for a top side of a structure.

In one embodiment, one or more support elements comprise a first elongate shaft and a second elongate shaft. In certain embodiment, a first elongate shaft is located proximate to a left side near a front side of a structure, and a second elongate shaft is located proximate to a right side near the front side of the structure. In some embodiments, first and second elongate shafts are rotatably coupled to a bottom side of a structure at a first end.

In various embodiments, a system includes a first support fasten mechanism and a second support fasten mechanism located on a top side of a structure at locations opposite locations where first and second elongate shafts are coupled to the structure. First and second support fasten mechanisms may secure each of first and second elongate shafts at a second end when a structure is un-collapsed. In a further embodiment, one or more support elements comprise one or more joint support structures that are coupled to one or more joints located on left and right sides of a structure. A joint support structure may include a first locking member coupled to a first half of a joint and a second locking member coupled to a second half of the joint corresponding to the first half of the joint. A first locking member may engage a second locking member to lock a joint in a fixed position in response to a structure being un-collapsed.

In one embodiment, a method includes providing a light box that includes a power supply and a substantially cube-shaped structure comprising a top side, a bottom side, a rear side, a left side, and a right side. In certain embodiments, an inside of a structure is accessible through an open front side of a structure. A light box, in a further embodiment, includes one or more lighting elements disposed within a structure that illuminate an inside of the structure. A light box may include one or more joints located on each of a right side and a left side of a structure. One or more joints may allow a structure to collapse into a substantially flat shape. A light box may include one or more support elements providing support for a top side of a structure.

A method, in a further embodiment, includes un-collapsing a light box. In one embodiment, a method includes securing one or more support elements. In a further embodiment, a method includes activating one or more lighting elements of a light box.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1A:
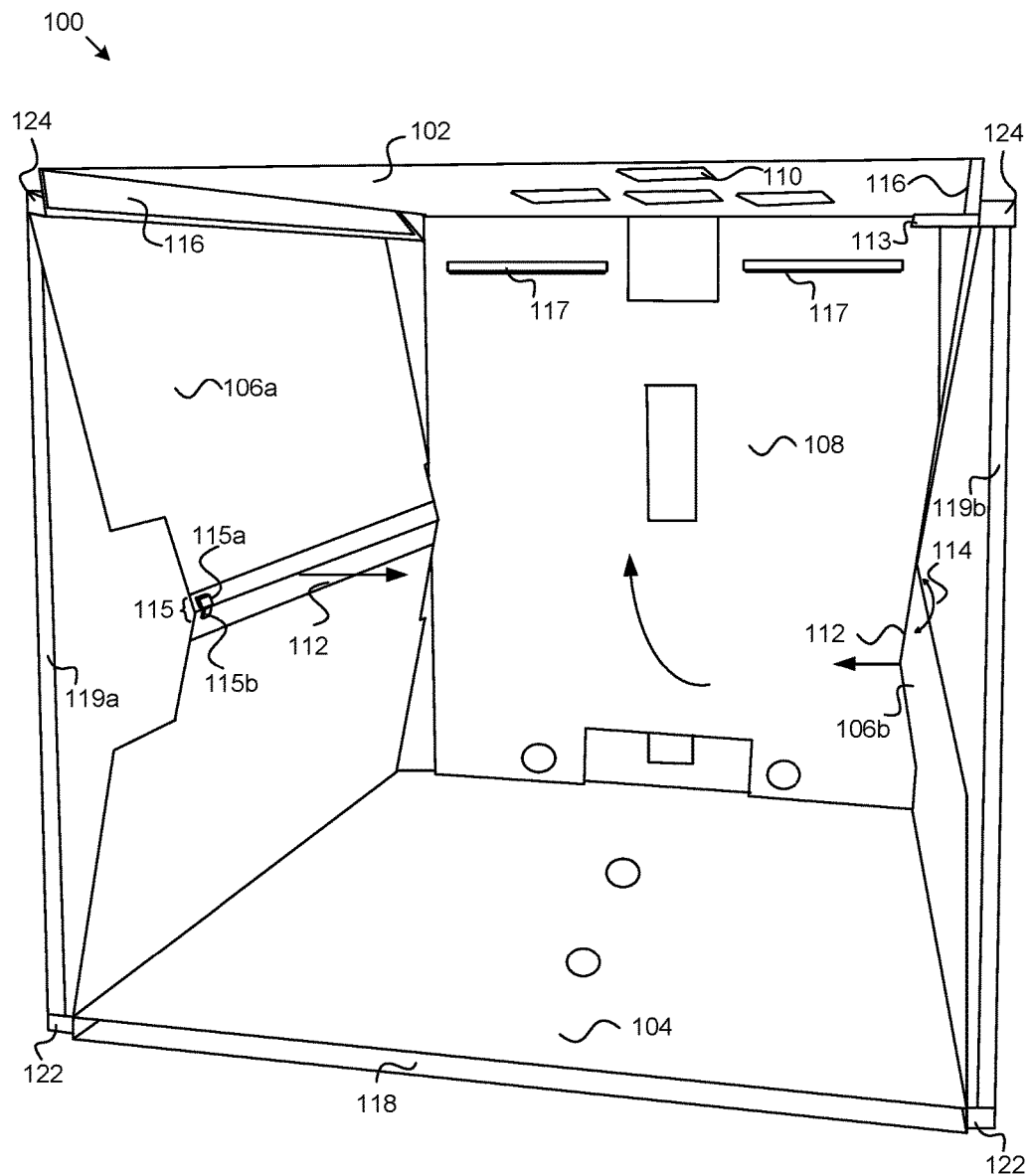
FIG. 1A is a perspective view of a collapsible light box in accordance with the subject matter presented herein.

FIG. 1A depicts a perspective view of a collapsible light box 100 in accordance with the subject matter described herein. As described herein, a light box is an apparatus or structure that provides lighting, such as diffused lighting, and a background against which to place an object for photography. A light box may allow a photographer to take images of objects that require distinct lighting to allow details of the object to stand-out or be seen more prominently. In certain embodiments, the light box 100 described herein may be utilized as a home scanner/digitizer for archiving, scrapbooking, photography, marketing, e-commerce, or the like, by using a camera or a smart device, such as a smart phone, tablet computer, or the like, that has an integrated camera to capture images of objects within the light box 100.

When not in use, the light box 100 of the present disclosure may be collapsed for easy storage, transport, or the like. For example, the light box 100 may collapse to be placed in a storage bag. The storage bag may also be large enough to contain one or more attachments for the light box 100, described below. Further, the light box 100 may include securing mechanisms, such as magnets or hook-and-loop mechanisms, which hold and secure the light box 100 in a collapsed position.

The light box 100, in some embodiments, comprises a substantially cube- or box-like shape that has a top side 102, a bottom side 104, a right side 106a, a left side 106b, and a rear side 108. In one embodiment, the light box 100, when un-collapsed, comprises an "hour glass" shape such that the sides 106 of the light box 100 angle in towards the inside of the light box 100 at a particular angle. In certain embodiments, the "hour glass" shape of the light box 100 diffuses light within the light box 100 based on the angle 114 at which the sides bend in towards the inside of the light box 100, which may focus the light on an object within the light box 100 and decrease "dazzle" or glare within the light box 100. In a further embodiment, the light box 100 may have a substantially trapezoidal or "volcano" shape where the width of the top side 102 is shorter than the width of the bottom side 104.

In some embodiments, the angle at which the sides 106 of the light box 100 angle in towards the inside of the light box 100 may be adjustable by setting the cut-outs 422 at different positions in the back side 108, described below with reference to FIG. 4B. For example, the cut-outs 422 in the sides 106 may sit in various notches cut into the edge of the back side 108 that allow the sides 106 to angle in at various angles. By adjusting the angle that the sides 106 angle in, different diffused lighting effects can be created within the light box 100.

In certain embodiments, the inside of the light box 100 is accessible through an open front side of the light box 100. In some embodiments, the light box 100 comprises a removable front side, which provides access to the inside of the light box 100 (for example, to place objects inside the box, to take perspective photographs of the items in the box, or the like). The removable front side, in certain embodiments, may be replaced before capturing images of an object placed in the light box 100 in order to block external light from entering the light box 100.

In one embodiment, the light box 100 is composed of a substantially rigid material, such as wood, composite wood, plastic, metal, bamboo, high-strength cardboard, or the like. In some embodiments, the light box 100 is manufactured of plastic using a thermoforming process, an injection mold process, or the like. In certain embodiments, the light box 100 is large enough to accommodate documents, objects, etc., of various sizes and shapes. For example, the light box 100 may have dimensions (L×W×H) of 13"×13"×15", 12"×12"×13", or the like.

In some embodiments, the sides 102-108 of the light box 100 are separate pieces that are connected using flexible joints, such as hinges, interlocking mechanisms, or the like. In one embodiment, the sides 102-108 of the light box 100 are comprised of a single piece of material that is foldable or otherwise configured to un-collapse into the light box 100. The sides 102-108 of the light box 100, in some embodiments, are removable, interchangeable, or the like. In one embodiment, the sides 102-108 include various colors, backgrounds, textures, and/or the like, which may be customized to achieve different lighting effects, background effects, or the like.

In some embodiments, the inner surfaces of the sides 102-108 may include channels, grooves, slots, or the like, to receive interchangeable plates, faces, inserts, or the like. For example, the left and right sides 106a-b may include grooves or channels that receive different plates or faces that have different colors, backgrounds, textures, and/or the like to modify the effect of the illumination within the light box 100. In another embodiment, the interchangeable plates may include lighting elements that are activated in addition to, or in place of, the lighting elements 116 of the light box 100. In such an embodiment, the interchangeable plates may include contact points that correspond to contact points on the light box 100 and provide power from the power supply of the light box 100 to the lighting elements on the interchangeable plates.

Figure 10:
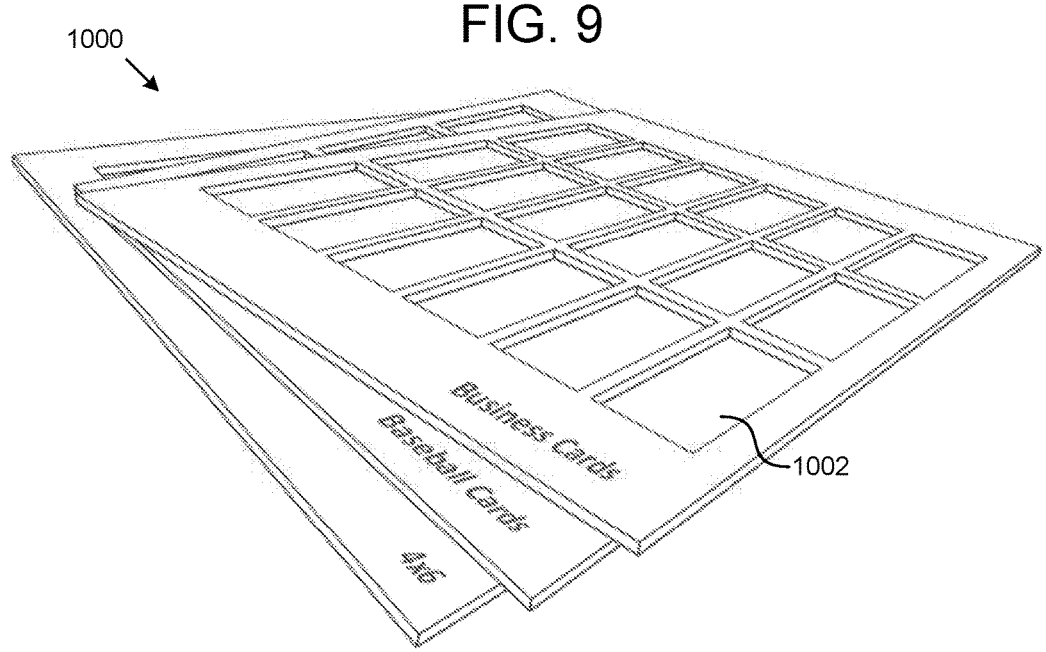
FIG. 10 is a perspective view of various guide trays for a collapsible light box in accordance with the subject matter presented herein.

Similarly, the bottom side 104 may include grooves, channels, or slots configured to receive inserts for the bottom surface. For example, the bottom side 104 may include grooves for receiving inserts with different backgrounds, colors, textures, and/or the like. Similarly, the bottom layer inserts may include design inserts that configure, organize, arrange, or layout the objects, images, documents, or the like in the light box 100. For example, an insert may include a "baseball card" insert, as depicted in FIG. 10, which allows a user to place different images within the slots of the insert and take an image of the layout.

In one embodiment, the top side 102 includes one or more openings 110 that may be used to take an image of an object inside the light box 100 from the top side 102. In certain embodiments, a camera may be used to capture an image of an object inside the light box 100, such as a film camera (e.g., a traditional film camera that uses 35 mm film), a digital camera, a smart phone camera, a tablet computer camera, a smart watch, an optical head-mounted display, or the like though the one or more openings 110. The openings 110 may be located in various positions along the top side 102.

In one embodiment, the openings 110 are all the same size. In certain embodiments, one or more of the openings 110 are different sizes. In some embodiments, the sizes of the openings 110 are adjustable to accommodate a variety of camera shapes and sizes. In one embodiment, the openings 110 include a height-adjustable mechanism that allows a user to adjust the height of a camera in relation to an opening 110. By including multiple openings 110, a user may select an appropriate angle to take a picture of an object in the light box 100 to reduce glare, capture different details of an object, or the like.

In one embodiment, the light box 100 includes covers for the openings 110. A cover may include an insert that is inserted into an opening 110 to block light from entering the opening. In some embodiments, the light box 100 includes a surface (not shown) that covers all the openings 110 at the same time. Such a cover may be attached to one of the sides 102-108 by a hinge and may be placed over the top side 102 to block light from entering the light box 100 through the openings 110. In a further embodiment, the light box 100 includes slideable covers that are built into the top side 102 and may be selectively opened and closed by sliding the cover open and closed. In certain embodiments, the one or more openings 110 may be used to lift and setup the light box 100 in an un-collapsed state in such a manner that a user does not pinch his fingers while preparing the light box 100 for use.

In one embodiment, an object is placed on the bottom side 104 of the light box 100. The bottom side 104 may include different background colors, such as black, white, grey, red, blue, or the like, to accommodate a photographer's preferences. In certain embodiments, as described above, the backgrounds comprise interchangeable inserts that may be inserted in the bottom side 104. For example, a photographer may insert a black surface background for some objects and a white surface background for other objects. In similar embodiments, the back side 108 may also include interchangeable background inserts, which may be useful for capturing images taken from the front side (e.g., the removed side) of the light box 100. In such an embodiment, the background inserts may create an "infinity corner" such that the rigid or hard corners of the light box 100 are not visible (because the rigid corners are covered by the background insert).

In some embodiments, the bottom side 104 (or any of the other sides 102, 106a-b, 108) includes a color strip that may be used to calibrate a camera being used to capture images of the object inside the light box 100. In a further embodiment, the bottom side 104 includes feet (not shown) attached to the underside of the bottom side 104 that support the light box 100. In certain embodiments, feet may be attached to the left and right sides 106a-b near the top side 102 and the bottom side 104 so that the light box 100 can be set up or stored on its side when it is collapsed. In some embodiments, when the light box 100 is in a collapsed state, wires for the electrical components of the light box 100 (e.g., the lighting elements 116 (described below), the USB ports (described below), or the like), may be wrapped around the feet to easily and cleanly store or transport the light box 100.

In certain embodiments, the light box 100 may be used to digitize pages of various types of books without unbinding the books. In one embodiment, the bottom side 104 includes a transparent plate or glass (not shown) that may be placed over the pages of an open book, a plurality of photos spread out within the light box 100, one or more documents, or the like, in order to flatten the objects within the light box 100. The transparent plate may be manufactured of glass, plastic, Plexiglas®, or the like, and may be heavy enough to hold down and flatten the pages of a book. The transparent plate, in such an embodiment, may be attached to a side 102-108 of the light box 100, by a hinge or the like, or may be a separate piece that may be selectively used and removed by the user. Other means for securing pages of an open book may include magnets, weights, or the like. In a further embodiment, the light box 100 may include supports that can be inserted on the bottom side 100 to hold a book open at various angles.

In a further embodiment, the bottom side 104 may include a turntable (not shown), which may be used in conjunction with a photo attachment described below. An object may be placed in the light box 100 on the turntable such that multiple different images of the product may be captured. In some embodiments, the turntable may be in communication with a device that is capturing the images, such as a smart phone. For example, the turntable may be in communication with a smart phone via a Bluetooth® connection, a Wi-Fi connection, a near-field communication (NFC), or the like network. The smart phone, in such an embodiment, may control various functions of the turntable, such as turning the turntable on and off, adjusting the rotational speed and/or direction of the turntable, or the like.

In some embodiments, the left and right sides 106a-b are collapsible such that the light box 100 can be collapsed to a substantially flat shape. In one embodiment, the left and right sides 106a-b include one or more sets of hinges 112 that allow a left and/or right side 106a-b to collapse in on itself. The hinges 112 may include butt hinges, butterfly hinges, flush hinges, plano hinges, resistance hinges, extrusion hinges, or the like. In one embodiment, the hinges 112 may lock in place when the light box 100 is not collapsed. In some embodiments, a left and/or right side 106a-b may include a crease or fold that allows a left and/or right side 106a-b to fold in on itself instead of using hinges 112.

In one embodiment, the light box 100 includes one or more joint support structures 115 that lock the light box 100 in an un-collapsed position. The joint support structures 115 may be located on the joints, e.g., hinges 112, such that when a hinge 112 is expanded, a joint support structure 115 locks into place and provides support for the hinge and the sides 106a-b of the light box 100. The joint support structure 115 may comprise two separate locking pieces 115a-b, one on each side of the hinge 112, which fit together, lock together, slide together, or the like, when the light box 100 is un-collapsed or when the sides 106a-b of the light box are positioned at an inward angle 114 when un-collapsed. For example, one piece 115a of the joint support structure 115 may slide into the other piece 115b and fit securely using a friction fit, a clip fit, a snap fit, or the like. In certain embodiments, the joint support structure 115 may be unlocked by positioning the sides 106a-b at a substantially vertical angle (such as by lifting the top side 102 such that the sides 106a-b no longer angle inwards), which may release one piece 115a of the joint support structure 115 from the other 115b.

The joint support structure 115 may be made of the same material as the hinge 112, or a different, substantially rigid material. The joint support structure 115 may be molded into the hinge 112 or may be a separate component. The joint support structure 115 may be adjustable such that it can be moved along a length of the hinge 112 to provide support as desired by a user. One or more joint support structures 115 may be located along the length of a hinge 112. In some embodiments, the joint support structures 115 may be detachable from the hinge 112.

In certain embodiments, the left and/or right sides 106a-b are disposed at an angle 114 when the light box 100 is un-collapsed such that the left and/or right sides 106a-b can only bend or fold in towards the center of the light box 100 and not in the opposite direction. In certain embodiments, the left and/or right sides 106a-b are disposed at about an eight degree angle when the light box 100 is in an un-collapsed state. In this manner, the left and/or right sides 106a-b are prevented from bending in an outward direction and unintentionally collapsing the light box 100.

In a further embodiment, the left and/or right sides 106a-b fold in on one another such that the left and/or right sides 106a-b lay substantially flat on one another. For example, a left side 106a may not include a hinge 112 in the middle of the left side 106a, but only at the bottom of the left side 106a that connects the left side 106a to the bottom side 104. When the light box 100 is collapsed, the left side 106a may lay directly on the bottom side 104 and the right side 106b may lay on the left side 106a, then the back side 108 and the top side 102 may lay flat on the left and/or right sides 106a-b. In such an embodiment, the left and/or right sides 106a-b may substantially support the top side 102.

Figure 3:
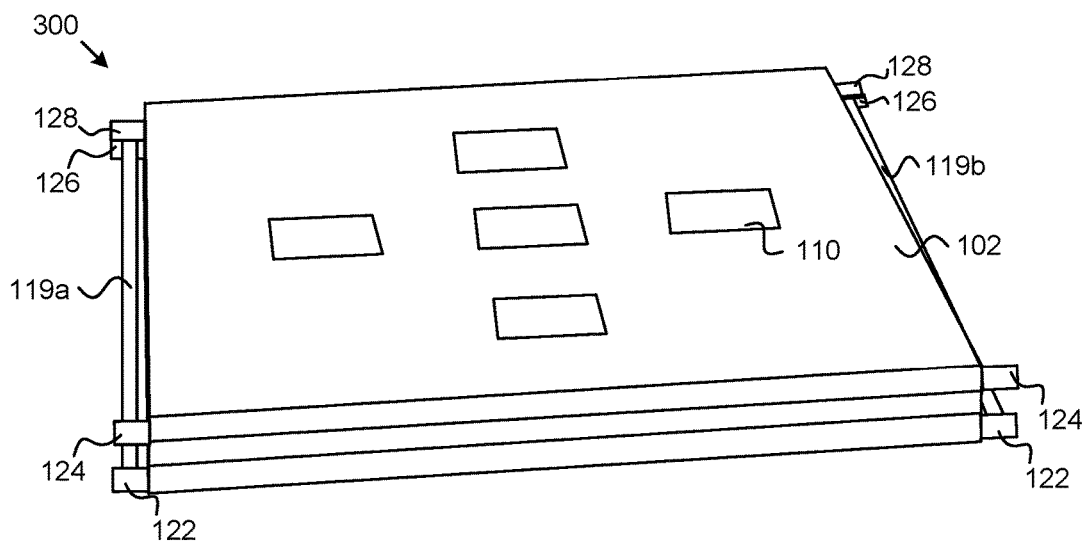
FIG. 3 is a top view of a collapsed light box in accordance with the subject matter presented herein.

In one embodiment, the back side 108 is connected to the top side 102 using a hinge 112, a crease, or other flexible mechanism. Alternatively, the back side 108 may be connected to the bottom side 104 using a hinge 112 or the like. The back side 108, when the light box 100 is not collapsed, provides support for the top side 102. In certain embodiments, the back side 108, when not collapsed, locks into the bottom side 104 in order to prevent the back side 108 from inadvertently collapsing. For example, the back side 108 may connect to the bottom side 104 using a tongue and groove mechanism, magnets, snaps, a hook-and-loop mechanism, or the like. In one embodiment, the light box 100 is collapsed by folding the back side 108 in to the top side 102 such that the back side 108 lays substantially flat against the top side 102. The left and right sides 106a-b may then be collapsed to allow the light box 100 to lay substantially flat, as depicted in FIG. 3.

In some embodiments, the light box 100 may include a mechanism configured to un-collapse and collapse the structure without any intervention by a user. For example, the light box 100 may include a mechanism connected to the hinges 112 that causes the hinges 112 to open or close and un-collapse or collapse the light box 100. The mechanism may be controlled using an application on a smart phone in communication with the mechanism or light box 100 via a Bluetooth® connection, an IR connection, or the like.

In one embodiment, the light box 100 includes one or more lighting elements 116 that illuminate the light box 100. In certain embodiments, the lighting elements 116 include strips of LED lights of various colors, incandescent lights, fluorescent lights, neon lights, ultra-violet lights, black lights, or the like. The lighting elements 116 may be permanently attached to the light box 100 such that the lighting elements 116 remain attached to the light box 100 when the light box 100 is in a collapsed state. In some embodiments, the lighting elements 116 may be selectively coupled to the light box 100 such that the lighting elements 116 may be removed, or interchanged, from the light box 100.

In one embodiment, the light box 100 includes a lighting controller that controls a brightness, an intensity, a color, a blinking rate, or the like of the lighting elements 116. The lighting controller, for example, may include a dimmer to adjust the brightness of lighting elements 116. The lighting controller may be controlled by a user or may automatically control different settings of the lighting elements 116. For example, the lighting controller may set a brightness of the lighting elements 116 based on a brightness of the lighting external to the light box 100. In certain embodiments, the lighting elements 116 are turned on and off automatically based on the state of the light box 100, e.g., the lighting elements 116 may be turned on when the light box 100 is set up and/or the lighting elements 116 may be turned off when the light box 100 is collapsed. In various embodiments, the lighting elements 116 may be manually turned on/off using a toggle switch, or other electrical switch.

In some embodiments, the light box 100 may be enabled with Bluetooth®, an IR receiver, or a similar short-range communication protocol, that allows a device to communicate with the light box 100. For example, a Bluetooth®-enabled device may include an application that allows a user to control different characteristics of the lighting elements 116, such as the brightness, color, and/or intensity of the lighting elements 116.

In certain embodiments, the lighting elements 116 are attached to the top side 102 of the light box 100. For example, the lighting elements 116 may be attached to an extrusion hinge, described below with reference to FIG. 8, which couples the top side 102 to one of the left and right sides 106a-b. In further embodiments, the lighting elements 116 are attached to any side 102-108 of the light box 100, and any number of lighting elements 116 may be included.

In some embodiments, the lighting elements 116 are interchangeable or replaceable, which allows different types of lighting elements 116, lighting elements 116 of different colors, replacement lighting elements 116, or the like to be installed in the light box 100. In one embodiment, the lighting elements 116 may be selectively turned on and off. For example, if the light box 100 includes a plurality of lighting elements 116, all the lighting elements 116 may be turned on or off together, or each lighting element 116 may be turned on or off independently of other lighting elements 116.

In some embodiments, the lighting elements 116 include interchangeable covers, filters, or the like that may be placed over the lighting elements 116 to provide different lighting effects for the light box 100. For example, the filters may change the color, an intensity, a brightness, or the like of the lighting elements 116. The light box 100 may include reflection points attached to one or more of the inner surfaces of the sides 102-108 of the light box 100, which may also provide different lighting effects by reflecting the light at different locations, angles, or the like.

In one embodiment, the lighting elements 116 are attached to the sides 102-108 of the light box 100 at specific positions or angles to achieve different lighting effects. For example, the lighting elements 116 may be positioned within the light box 100 such that the angle of the light does not generate glare on an object within the light box 100. For example, if the light box 100 is being used to digitize scrapbook pages that are contained within a plastic sleeve, the lighting elements 116 may be attached to the sides 102-108 of the light box 100 at locations that reduce or remove glare produced by the light reflecting off of the plastic sleeve. In this manner, it is not necessary to remove scrapbook pages, photos, documents, or the like, from their protective sleeves. In some embodiments, the angle of the position of the lighting elements 116 can be adjusted.

In certain embodiments, the light box 100 includes a light shield 113 that diffuses, blocks, scatters, distributes, or the like light produced by the lighting elements 116. The light shield 113 may be located substantially perpendicular to a lighting element 116 or may be positionable (e.g., by a user) at an angle in relation to the lighting element 116 to diffuse more or less light, as desired. The light shield 113 may be of various opacities, colors, and/or the like to provide different lighting effects within the light box 100.

In a further embodiment, the light box 100 includes one or more extensions 117 (also known as brackets, ledges, ridges, outcroppings, projections, or the like) positioned on the back side 108 of the light box 100 where backdrops or other objects may be hung. For example, a backdrop may include cutouts that match with the position of one or more extensions 117 on the back side 108 such that the backdrop hangs from the back side 108 by inserting the extensions 117 into the cutouts on the backdrop. Various objects may be hung from the extensions 117. The extensions may be of various shapes and sizes, and may include different types of hooks, ledges, or the like to securely hold objects hanging from the extensions 117. The extensions 117 may also be located on either of the left and right sides 106a-b and/or the top surface 102.

In one embodiment, the light box 100 includes a slot, drawer, or the like 118 located on the underside of the bottom side 104. In one embodiment, the slot 118 may include a storage drawer, or the like, which may be used to store accessories for the light box 100, such as interchangeable plates for the inner surfaces of the sides 102-108, filters for the lighting elements 116, or the like. In some embodiments, the slot 118 may house a metal/magnetic sheet, plate, insert, or the like that allows magnetic items placed in the light box 100 to be secured to the bottom side 104 by the magnetic pull between the object and the metal sheet. In another embodiment, the magnetic sheet may be placed within the light box 100 resting on the bottom side 104. For example, magnetic buttons or weights may be used to hold down corners of an open book while a user captures an image of the pages of the book. In one embodiment, the slot may include an extender configured to extend out from the front of the light box 100 to increase the length of the bottom side 108.

In some embodiments, the light box 100 includes one or more support elements 119a-b. In one embodiment, the support elements 119a-b are elongate shafts that have a first end and a second end and are made of a substantially rigid material (e.g., plastic, metal, wood, or the like). The one or more support elements 119a-b may be configured to provide additional support for the light box 100 when the light box 100 is un-collapsed (e.g., to provide additional support for cameras, or other devices, that may be placed on the top of the light box 100). In some embodiments, the one or more support elements 119a-b are located proximate to the left and right sides 106a-b of the light box 100 near the front side of the light box 100, which provides additional support that may be lacking with the absence of a supporting front side. In a further embodiment, the support elements 119a-b are located at the front of the light box 100. Support elements 119a-b, however, may be located at various positions along the light box 100.

The support elements 119a-b may be rotatably coupled to the light box at first ends by a swivel mechanism 122 that allows the support elements 119a-b to rotate from a substantially vertical position (e.g., about a 90° angle) when the light box 100 is un-collapsed to a substantially horizontal position (e.g., about a 0° angle) when the light box 100 is collapsed, and vice-versa. In certain embodiments, the support elements 119a-b are coupled to the light box 100 by a swivel mechanism 122 located near the bottom side 104 of the light box 100 such that the support elements 119a-b rotate up towards the top side 102 to support the light box 100. In certain embodiments, the support elements 119a-b may be coupled to a swivel mechanism 122 located near the top side 102 of the light box 100 such that the support elements 119a-b rotate down towards the bottom side 104 to support the light box 100.

In certain embodiments, the support elements 119a-b fit, snap, clip, are magnetically attracted to, or the like into a support fasten mechanism 124. Thus, for example, the support elements 119a-b coupled to a swivel mechanism 122 located near the bottom side 104 of the light box 100 may snap into a support fasten mechanism 124 located near the top side 102 of the light box 100. Alternatively, if the support elements 119a-b are coupled to a swivel mechanism 122 located near the top side 102 of the light box 100, the support elements 119a-b may snap into a support fasten mechanism 124 located near the bottom side 104 of the light box 100.

In certain embodiments, the support elements 119a-b have a telescoping structure such that the support elements 119a-b can collapse and extend instead of having a permanent fixed length. In such an embodiment, the support elements 119a-b may include a locking mechanism that locks the support elements in an extended or a collapsed position. In a further embodiment, the support elements 119a-b fold in and out to collapse and extend as needed. In certain embodiments, the support elements 119a-b, swivel mechanism 122, and/or support fasten mechanism 124 are detachable from the light box 100.

The light box 100, in some embodiments, includes a power supply (not shown) to power the lighting elements 116, a camera, a smart device, or the like. For example, the power supply may include one or more batteries (e.g., 9 volt, 12 volt, double-A, triple-A, or the like) that power the lighting elements 116. In another example, the power supply may include solar panels, or the like, such that power for the light box 100 may be derived from solar energy. In yet another embodiment, the power supply may be an external battery pack that plugs into the light box 100 and/or one or more of the lighting elements 116.

In some embodiments, the light box 100 includes a plug-in power supply, such as an AC plug for an AC socket, a 5V power port for power supplies that provide 5V power (such as a battery pack, a computer port, or the like), or the like. The lighting elements 116 may also include a separate power supply, such as a battery that powers each lighting element 116 separately. In some embodiments, the light box 100 may be comprised of transparent material that allows external light to shine into the box 100 from the outside. The lighting elements 116 may be placed on the outside of the box 100, in such an embodiment, and shine through the left and/or right sides 106a-b, the back side 108, and/or the top side 102 to illuminate an object within the box 100.

In a further embodiment, the light box 100 includes a power supply connector for a device that is being used to take images of an object within the light box 100. For example, the light box 100 may include one or more USB ports to provide power to a smart phone, camera, or the like. Other connections may be used such as a 30-pin connector, an 8-pin connector, and/or any other connector that provides power to a camera or a smart device with a camera. Devices may also derive power from the light box 100 using a wireless power transfer, e.g. inductive charging. In this manner, by integrating lighting elements 116 and a power supply, the collapsible light box 100 is a self-contained and portable light box 100.

Figure 1B:
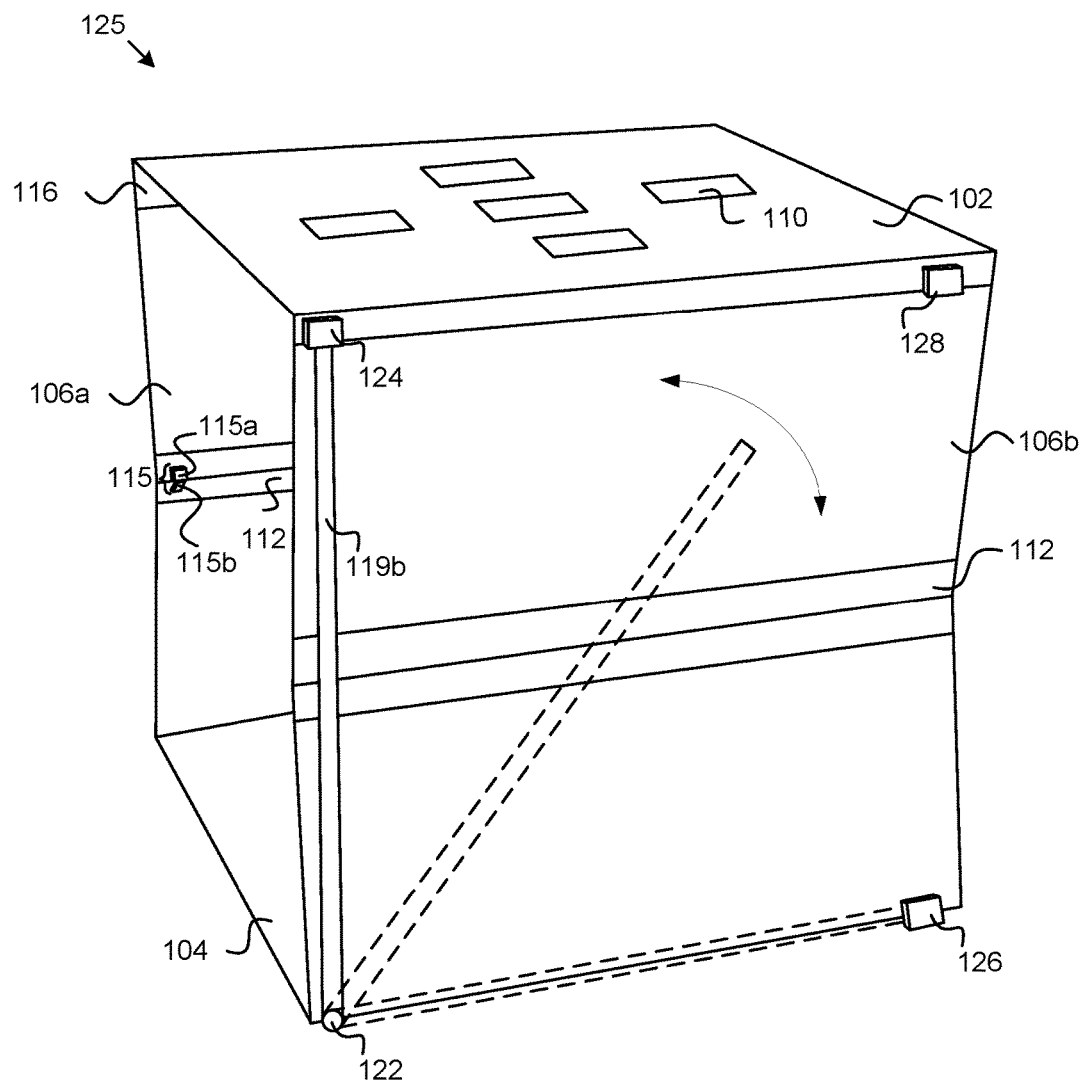
FIG. 1B is a side view of a collapsible light box in accordance with the subject matter presented herein.

FIG. 1B is a side view of a collapsible light box 125 in accordance with subject matter disclosed herein. In one embodiment, the collapsible light box 125 is substantially similar to the light box 100 depicted in FIG. 1A. As depicted in FIG. 1B, a light box 125 may include collapsible left and right sides 106a-b that collapse in on themselves using one or more hinge mechanisms 112, such as a plano hinge, extrusion hinge, or the like. The left and right sides 106a-b may also be connected to a top side 102 and a bottom side 104 using a hinge mechanism 112 to allow the left and right sides 106a-b to fold inward and collapse in on themselves such that the light box 125 may collapse to a substantially flat state.

FIG. 1B also depicts a light box 125 that, in some embodiments, includes support elements 119a-b. In one embodiment, a support element 119b may be coupled to the light box 125 near the bottom side 104 and the front side of the light box 125. A corresponding support element 119a (not shown) may be located near the left side 106a of the light box 125. The support element 119b may have a permanent, fixed length and may be coupled to the light box 125 by a swivel mechanism 122 that allows the support element 119b to rotate from a substantially vertical position (when the light box 125 is un-collapsed) to a substantially horizontal position (when the light box 125 is collapsed), and vice-versa.

The support element 119b may snap or otherwise fit securely in a support fasten mechanism 124 when the light box 125 is un-collapsed. When the light box 125 is collapsed, the support element 119b may fit securely in a retaining member 126 that securely holds the support element 119b when the support element 119b is not in use (e.g., when the light box 125 is collapsed). An auxiliary retaining member 128 securely holds the support element 119b within the retaining member 126 when the support element 119b is securely fastened to the support fasten mechanism 124. For example, when the light box 125 is collapsed, the auxiliary retaining member 128 may sit substantially flush or against the retaining member 126 to help hold the support element 119*b* securely in the retaining member 126.

Figure 2:
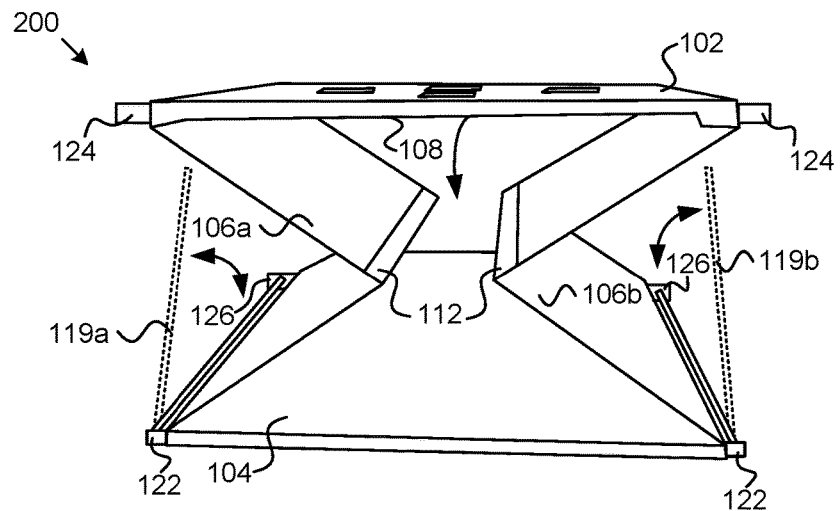
FIG. 2 is a perspective view of a collapsible light box being collapsed or un-collapsed in accordance with the subject matter presented herein.

FIG. 2 is a perspective view of a light box 200 that is being collapsed or assembled. The light box 200 may be substantially similar to the light box 100 depicted in FIG. 1A. In one embodiment, the left and right sides 106*a-b* of the light box 200 fold inward and/or outward, depending on whether the light is being collapsed or assembled. The left and right sides 106*a-b*, as described above, include hinges 112 that allow the sides 106 to fold in or out. When being assembled, the back side 108 may fold down and lock into the bottom side 104 to support the light box 200 in an upright, assembled position. When being collapsed, the back side 108 folds against the top side 102 and the left and right sides 106*a-b* of the light box 200 collapse, which allows the light box 200 to lay substantially flat, as shown in FIG. 3. In certain embodiments, the light box 200 includes a mechanism that collapses and un-collapses the light box 200 without any intervention by the user. For example, the hinges 112 may include a mechanism that provides enough force to open and close the hinges 112, and ultimately un-collapse or collapse the light box 200.

In some embodiments, one or more support elements 119*a-b* may be unsecured from the support fasten mechanisms 124 on each side of the light box 200 when the light box 200 is collapsed. In such an embodiment, the support elements 119*a-b* may be securely fastened in second support fasten mechanisms 126. In one embodiment, when the light box 200 is being un-collapsed, the support elements 119*a-b* are unsecured from the second support fasten mechanisms 126 and securely fastened to the support fasten mechanisms 124 located near the top side 102 of the light box 200, which provides additional support for the light box 200.

FIG. 3 is a top view of a collapsed light box 300 in accordance with the subject matter presented herein. The light box 300 may be substantially similar to the light box 100 depicted in FIG. 1A. In the depicted embodiment, the back side 108 and the left and right sides 106*a-b* have been collapsed to allow the light box 300 to lay substantially flat. In certain embodiments, the left and right sides 106*a-b* and the back side 108 fold into the light box 300 in order to allow the light box 100 to collapse in on itself and maintain a substantially square or rectangular shape.

In certain embodiments, the collapsed light box 300 may include a locking mechanism that maintains the light box 300 in a collapsed state. For example, the bottom side 104 may include one half of a hook and loop mechanism (such as a strap) and the top side 102 may include the other half of the hook and loop mechanism such that the two halves may be connected to hold the light box 300 in a collapsed state. Similarly, the locking mechanism may comprise one or more magnets that secure the light box 300 in a collapsed state. For example, the left and right sides 106*a-b* may each comprise magnets that attract and secure the light box 300 in a collapsed state when the left and right sides 106*a-b* are collapsed in on themselves.

In one embodiment, the collapsed light box 300 includes a handle (not shown) that is coupled to the light box 300. In some embodiments, the handle is selectively coupled to a side of the collapsed light box 300. For example, a handle may be added and removed to different sides of the collapsed light box 300 by a user. In certain embodiments, the handle may act as the locking mechanism that holds the collapsed light box 300 in a collapsed state. In a further embodiment, the handle may be built in to the light box 300. For example, the sides 102-108 may include cutouts for carrying the light box 300 when it is collapsed.

As described above, the support elements 119*a-b* of the collapsed light box 300 are securely fastened using the second 126 and third 128 support fasten mechanisms. The support elements 119*a-b* may snap into the second support fasten elements 126, for example, and may be held in place by the third support fasten mechanisms 128 when the light box 300 is collapsed. In this manner, the support elements 119*a-b* may not become loose or unattached while the light box 300 is being carried or moved when it is collapsed.

Figure 4A:
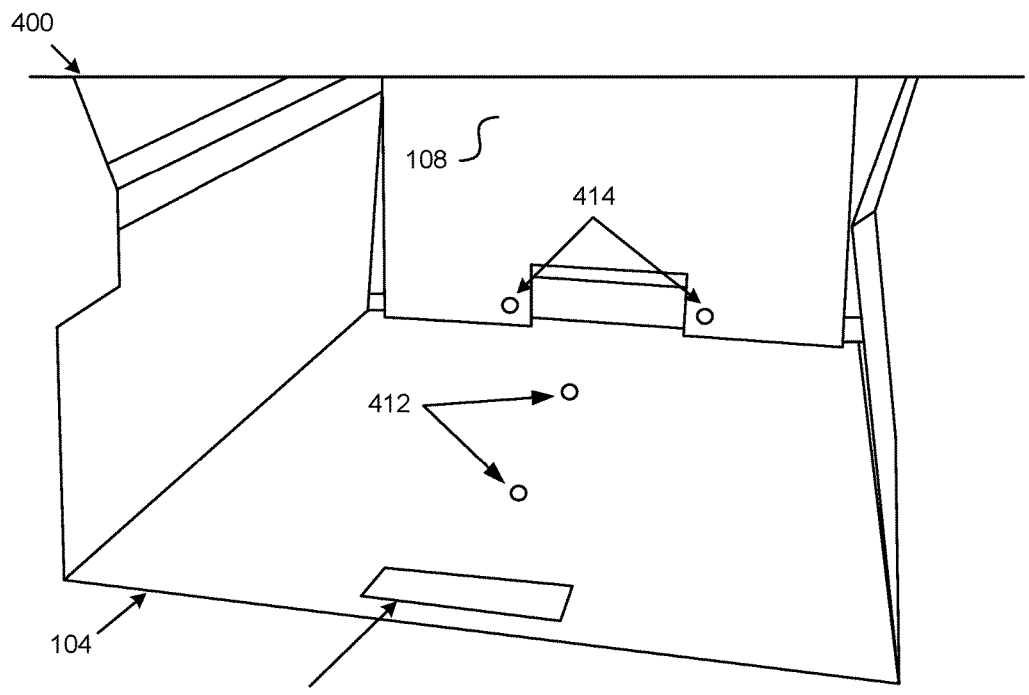
FIG. 4A is a perspective view of a collapsible light box in accordance with the subject matter presented herein.

FIG. 4A depicts a perspective view of a collapsible light box 400 in accordance with the subject matter presented herein. The light box 400 may be substantially similar to the light box 100 depicted in FIG. 1A. In one embodiment, the light box 400 includes one or more openings or holes 412 disposed on the bottom side 104 of the light box 400. In certain embodiments, the one or more holes 412 receive one or more attachments for the light box 400. For example, the one or more holes 412 may receive various pedestals, stands, turntables, or other attachments that may be used to support or accessorize objects placed within the light box 400.

In another embodiment, the one or more holes 412 may be used to secure a backdrop, panel, or the like that is used as a background for an item within the light box 400. For example, a backdrop or panel may have a width that corresponds to the width of the light box 400 and may be disposed at one end near where the top side 102 and the back side 108 meet and curve downward toward the front of the bottom side 104. In such an embodiment, the one or more holes 412 may receive one or more securing members disposed on the backdrop such that the backdrop is secured to the light box 400. The backdrop may also be secured to the bottom side 104 using magnets, snaps, weights, hook-and-loop mechanisms, an adhesive, a friction fit, or the like. The backdrop may have different colors, scenes (e.g., the beach, a house, a tree, etc.), lighting effects, or the like.

In a further embodiment, the back side 108 may comprise one or more openings or holes 414 that receive one or more guide members disposed along the rear of the light box 400. The guide members may include dowels, screws, nails, or the like, that are disposed within the one or more holes 414 of the back side 108 when the light box 410 is in an un-collapsed state. In this manner, a user may align the guide members and the holes 414 to ensure that the back side 108 is in a correct position. In certain embodiments, the back side 108 is secured in an upright position by the guide members. For example, the back side 108 may snap into the guide members using the openings 414, or a different mechanism, such as magnets, a hook-and-loop system, or the like, as is known in the art.

Figure 4B:
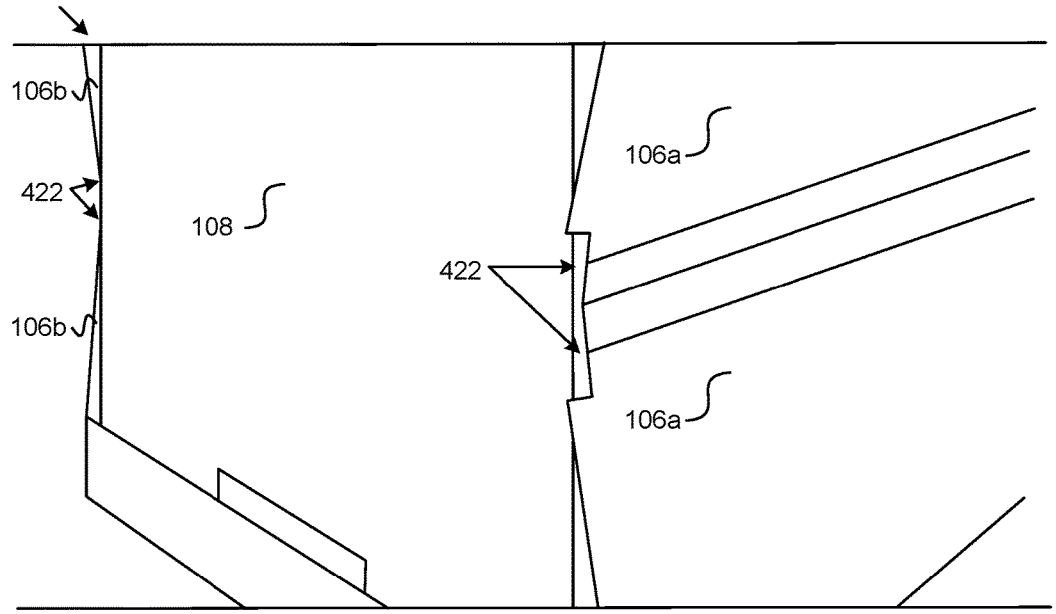
FIG. 4B is a perspective view of a collapsible light box in accordance with the subject matter presented herein.

FIG. 4B depicts another perspective view of a collapsible light box 410 in accordance with the subject matter presented herein. The light box 410 may be substantially similar to the light box 100 depicted in FIG. 1A. In one embodiment, the left and right sides 106*a-b* comprise one or more notches 422 disposed along an edge of the left and right sides 106*a-b*. The one or more notches 422 may be configured such that the left and right sides 106*a-b* are secured to the back side 108 when the light box 410 is un-collapsed. The one or more notches 422 allow the left and right sides 106*a-b* to bend inward and be situated against the back side 108 in such a way as to not bend entirely inward by resting against the back side 108.

Figure 5:
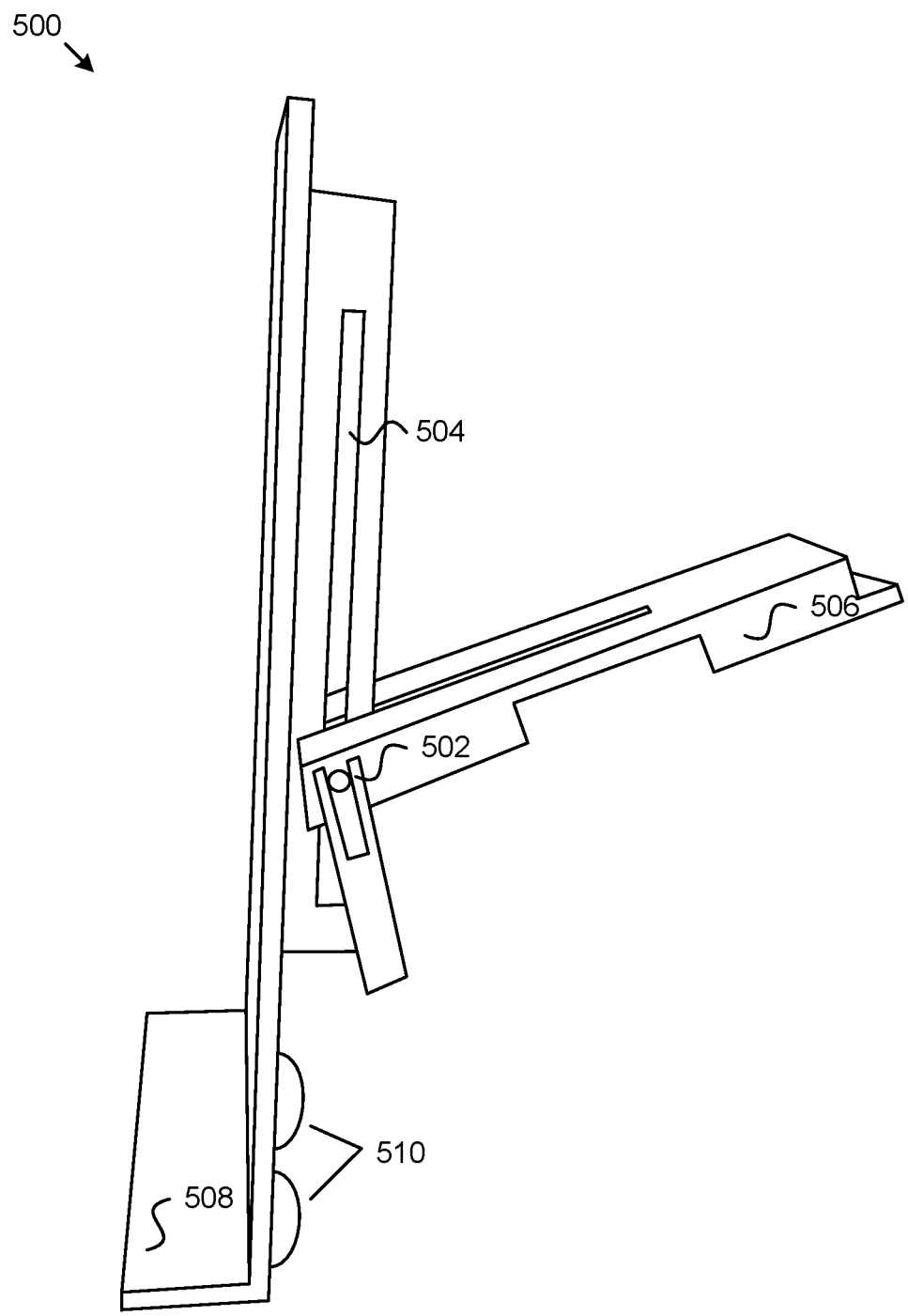
FIG. 5 is a side view of an attachment for a collapsible light box in accordance with the subject matter presented herein.

FIG. 5 is a side view of an attachment 500 for a collapsible light box 100 in accordance with the subject matter presented herein. In one embodiment, the attachment 500 attaches to the light box 100 to allow images to be taken from the front of the light box 100 (e.g., from the open or removed side of the light box 100). The attachment 500, in certain embodiments, is made of a substantially rigid material, similar to the light box 100, such as wood, plastic, metal, or the like. For example, the attachment 500 may be made of a rigid plastic material formed using a thermoforming or injection-molding process.

In the depicted embodiment, the height of the attachment 500 is adjustable by changing the position of an adjustment mechanism 502 along a grove 504 in the rear of the attachment 500. In this manner, the attachment 500 may be positioned at various heights depending on the user's preference to capture images of objects within the light box 100 from different angles. The attachment 500, in certain embodiments, attaches to an opening 110 on the top side 102 of the light box 100 using the insert member 506.

Figure 6:
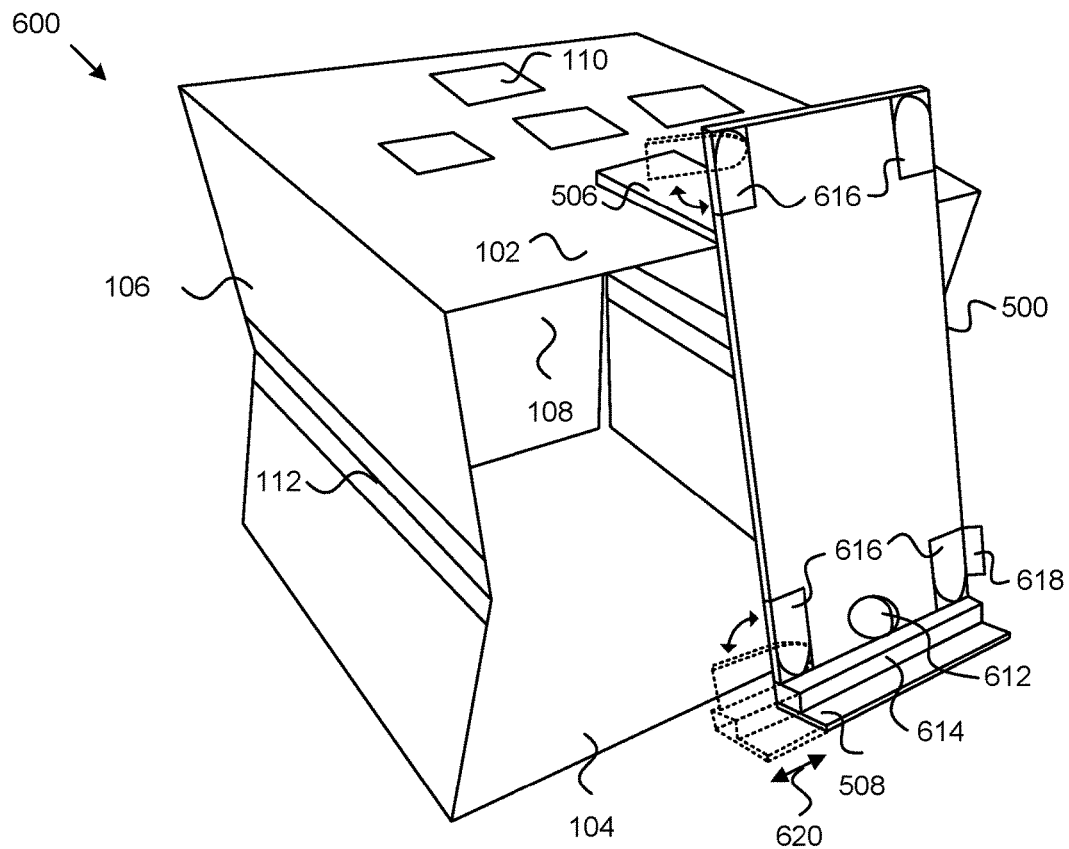
FIG. 6 is a perspective view of an attachment coupled to a collapsible light box in accordance with the subject matter presented herein.

In some embodiments, the attachment 500 includes an opening 612, shown in FIG. 6, which allows an image to be taken through the attachment 500. In certain embodiments, for example, a camera may be placed on a lip 508 or shelf 508 of the attachment 500 and orientated such that the camera can take an image of an object in the light box 100 through the opening 612 in the attachment 500. In certain embodiments, the attachment 500 may comprise multiple openings 612 located at different positions on the attachment 500. The sizes of the openings 612 may be adjustable, in some embodiments. In another embodiment, the openings may be selectively opened and closed, similar to the openings 110 on the top side 102.

In one embodiment, the attachment 500 includes lighting elements 510 located on the back side of the attachment 500. The lighting elements 510 may include LEDs, or the like, of varying brightness, intensity, color, or the like. In certain embodiments, the attachment 500 includes a switch that can be used to turn the lighting elements 510 on and off.

In some embodiments, the light box 100 may include one or more contact points (not shown) located at or near the openings 110 where the attachment 500 attaches. The attachment 500 may also include one or more corresponding contact points located on the insert member 506. The contact points on the light box 100 may be operably coupled to the power supply of the light box 100 such that when the contact points of the attachment 500 come in contact with the contact points of the light box 100, power can be directed to the attachment 500 to power the lighting elements 510, a camera device positioned on the attachment 500, or the like. In some embodiments, the attachment 500 may be provided with power from the light box 100 using a USB cable, or other wired power connection, and/or a wireless power supply via a wireless power transfer or a wireless energy transfer (e.g., inductive power).

In some embodiments, the attachment 500 may include extensions that slide, fold-out, or otherwise extend out from the sides of the attachment 500 to accommodate camera devices of different sizes. For example, the attachment 500 may be large enough to support a smart phone, but not a larger tablet computer. Thus, a user may slide or position extenders from the sides of the attachment 500 to provide support for the larger tablet computer.

FIG. 6 is a perspective view of a light box 600 with an attachment 500 coupled to the light box 600 in accordance with the subject matter presented herein. In one embodiment, the attachment 500 is coupled to the light box 600 by inserting the attachable insert member 506 into an opening 110 on the top side 102 of the light box 100. A camera is placed on the shelf 508 of the attachment 500 and oriented such that the lens of a camera is facing the inside of the light box 600 through the opening 612 in the attachment 500. In some embodiments, the attachment 500 includes a height adjustable insert 614 for the shelf 508, which allows the user to adjust the height of the camera while it is on the shelf 508. The height adjustable insert 614 may be detached from the attachment 500 when not in use.

In one embodiment, the attachment 500 includes one or more extensions 616 or "wings" that rotate in or out using a swivel mechanism. The extensions 616, in certain embodiments, provide additional support for larger devices, such as tablet computers that may be set on the attachment 500. In some embodiments, the extensions 616 may also include a support member 618 such that when the extensions 616 are extended out, the support member 618 may provide additional support underneath the device that is set on the attachment 500. In a further embodiment, the shelf and/or the height adjustable insert 614 is extendable 620 to provide additional support for larger devices used on the attachment 500, such as tablet computers.

Figure 7:
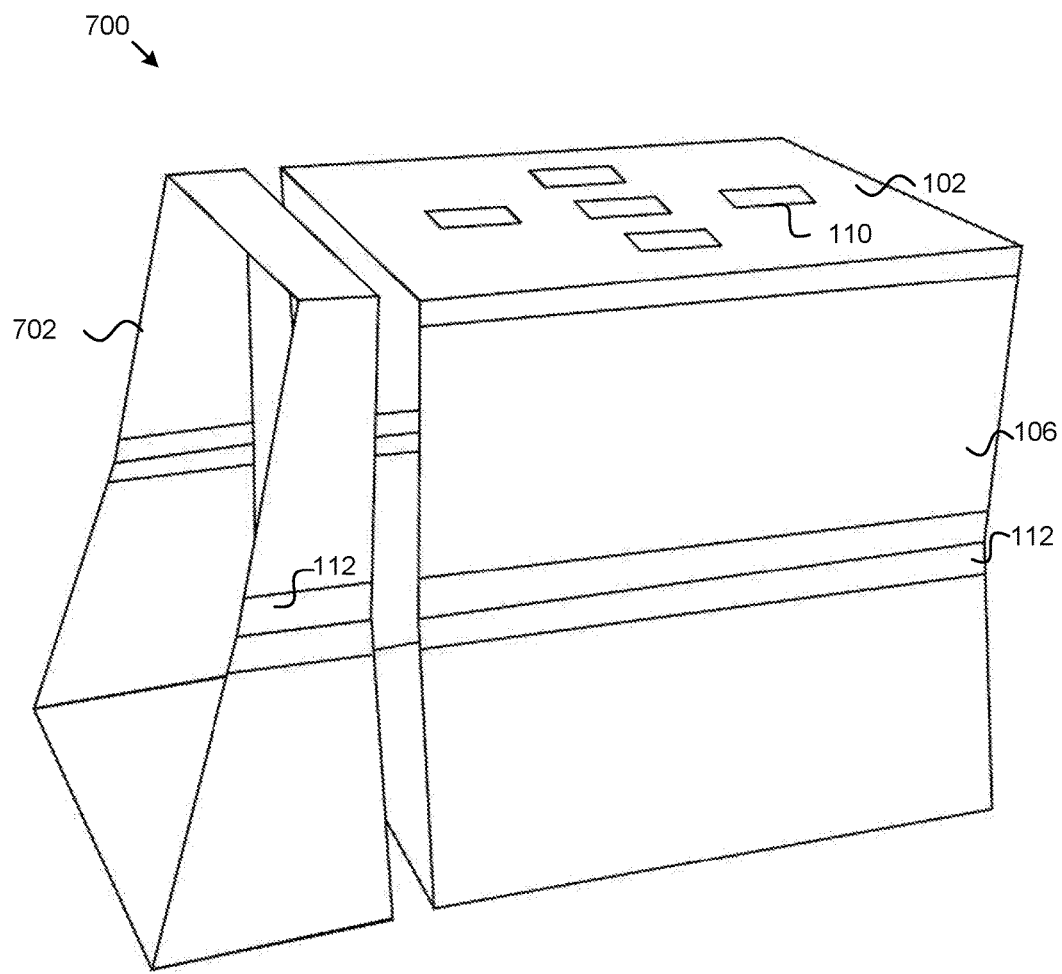
FIG. 7 is a perspective view of a hood attachment for a collapsible light box in accordance with the subject matter presented herein.

FIG. 7 depicts one embodiment of a light box 700 with a hood attachment 702. The hood attachment 702, in one embodiment, selectively attaches to the front of the light box 700 to extend the length of the bottom side 104 of the light box 700. For example, the hood attachment 702 may attach to the light box 700 using a friction fit, snaps, buttons, magnets, hook-and-loop mechanisms, or the like. In one embodiment, the hood attachment may increase the size of the light box 700 to at least 13"×19". In some embodiments, the size of the light box 700 with the hood attachment 702 will be larger or smaller than 13"×19".

The hood 702 may also include a cover (not shown) that extends from the top of the hood 702 to the bottom of the hood 702 to block light from entering the front side of the light box 700. The hood 702 may also include lighting elements and contact points that correspond to contact points located on the light box 700 such that when the contact points on the hood 702 come into contact with the contact points on the light box 700, power is directed from the power supply of the light box 700 to the lighting elements on the hood. The hood 702 may include hinges 112, similar to the hinges 112 located on the light box 700, which allows the hood 702 to be collapsed and un-collapsed.

Figure 8:
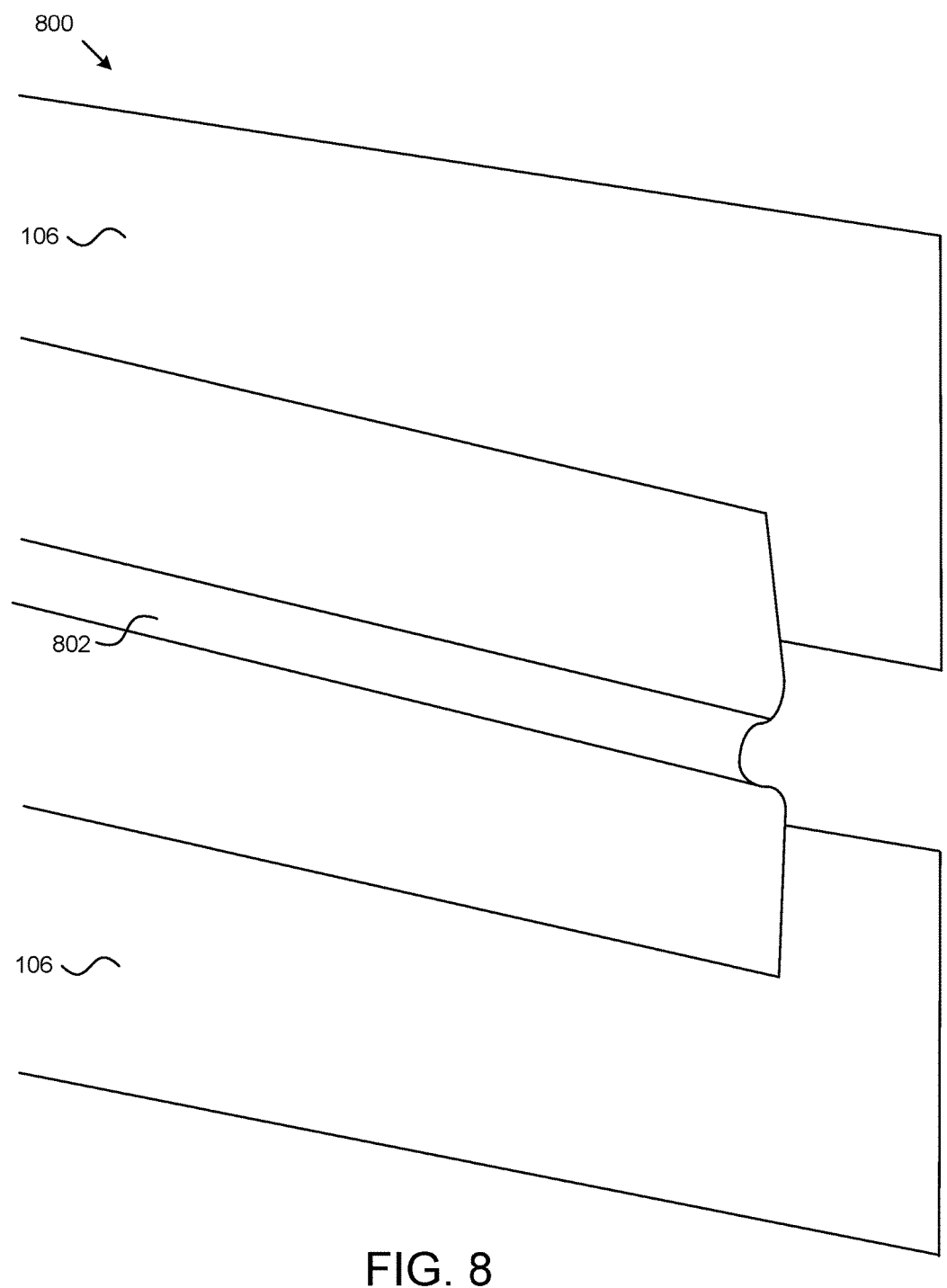
FIG. 8 is a perspective view of an extrusion hinge for a collapsible light box in accordance with the subject matter presented herein.

FIG. 8 depicts one embodiment 800 of an extrusion hinge 802. The extrusion hinge 802 may be used to hold two or more different sides 106 of the light box 100 together. The extrusion hinge 112 may be comprised of a single piece of material, such as plastic, and may be flexible enough to fold or bend, but rigid enough to support the sides of the light box 100 when the light box 100 is in an un-collapsed state. The extrusion hinge 802 may be formed of plastic using a thermoforming or injection-molding process. In certain embodiments, the extrusion hinge may be formed with inner compartments or channels that allow electrical wires, or the like, to be hidden away within the hinge 112.

Figure 9:
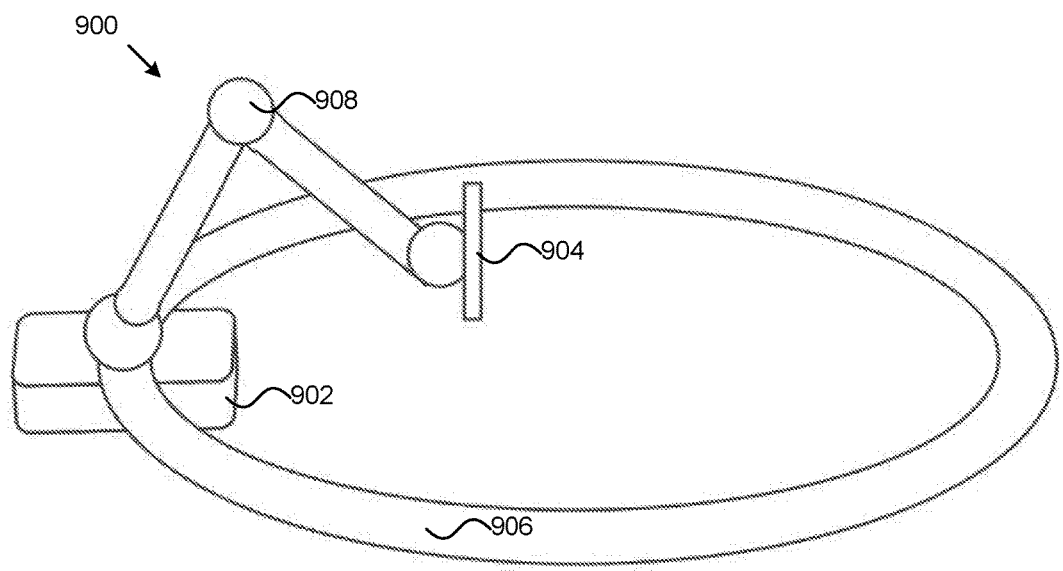
FIG. 9 is a perspective view of a camera attachment for a collapsible light box in accordance with the subject matter presented herein.

FIG. 9 depicts one embodiment of a camera attachment 900 for a light box 100. In one embodiment, the camera attachment 900 may be configured to attach to an opening 110 in the top side of the light box 100 using an insert member 902. The insert member 902 may be sized to fit in one of the openings 110 in the top side 102 of the light box 100 and may include attachment means, such as a friction fit, a clip, a magnet, or the like, that secures the camera attachment 900 to the top side 102.

A camera device, such as a DSLR camera, a point-and-shoot camera, a smart device with an integrated camera, or the like, may be mounted to the camera attachment at a mounting plate 904 using attachment means, such as a screw, an adhesive, a hook and loop mount, a button, a snap, a magnet, or the like. The camera device may be mounted to the mounting plate 904 in such a manner that the lens of the camera faces downward through a different opening 110 in the top side 102 to capture images of an object within the light box 100.

The camera attachment 900, in certain embodiments, includes a support member 906 that supports the camera when the camera is attached to the mounting plate 904. In such an embodiment, the camera may rest against the support member 906 such that the lens of the camera is pointed through the support member 906. The support member 906 may include a soft surface that the camera sits against such as a pillow, a beanbag, a cushion, or the like. Furthermore, the camera attachment 900 may include an adjustable arm 908 that allows the position of the camera to be adjusted to a preferred angle, height, or the like.

FIG. 10 depicts one embodiment of inserts 1000 for the light box 100. The inserts 1000 may be disposed on the bottom side 104 of the light box 100 such that images can be captured of the inserts from an opening 110 on the top side 102 of the light box 100. The inserts 1000 may include a plurality of openings 1002 where a user can insert different images.

The inserts 1000 may be used for various types of applications, such as for creating business cards, creating baseball cards, creating layouts for images of different sizes, for creating images with different borders, creating scrapbook pages, or the like. The inserts 1000 may include different foreground colors, patterns, layouts, or the like. For example, a user may place different individual images of players of a youth baseball team into each open slot 1002 of a baseball card insert and then take an image of the insert from an opening 110 on the top side 102 of the light box 100. In this manner, the user can create a customized layout or spread of different images by using the inserts 1000 as a guide.

Figure 11:
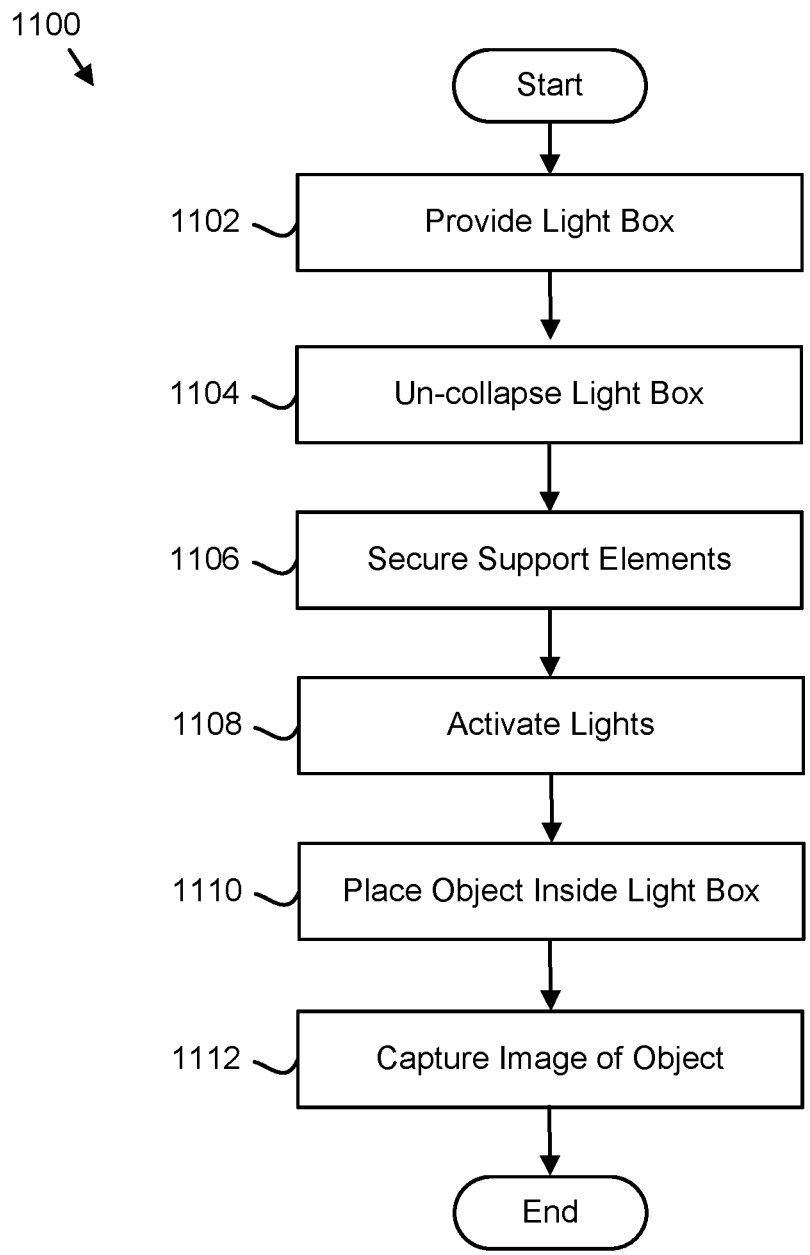
FIG. 11 is a schematic flow art diagram illustrating one embodiment of a method for using a collapsible light box.

FIG. 11 depicts a schematic flow-chart diagram of a method 1100 for a collapsible light box 100. In certain embodiments, a user performs the steps of the method 1100 described below. In one embodiment, the method 1100 begins and the method 1100 provides 1102 a collapsible light box 100 in a collapsed state. The method 1100 un-collapses 1104 the collapsible light box 100 by lifting the top side 102, for example, which causes the left and right sides 106a-b to extend vertically. The back side 108 also becomes disposed against the bottom side 104 when the light box 100 is un-collapsed, and the left and right sides 106a-b rest against the back side 108 using the notches described above with reference to FIG. 4B.

The method 1100 secures one or more support elements 119a-b to provide additional support for the top side 102 of the light box 100 when the light box 100 is un-collapsed. Furthermore, the method 1100 activates 1108 the lighting elements 116 of the light box 100, which may derive power from a provided power supply. The power supply may use an external battery, an AC power source, and/or a solar power source. The method 1100 places 1110 an object inside the light box 100 and the method 1100 captures 1112 an image of the object within the light box 100 using a camera device. A user may place the camera device on the top side 102 of the light box 100 to capture 1112 a top view of the object. A user may also use the attachment 500 to capture 1112 an image from the front of the light box 100, and the method 1100 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a substantially cube-shaped structure comprising a top side, a bottom side, a rear side, a left side, and a right side, wherein an inside of the structure is accessible through a front side of the structure, the front side being open;
   one or more joints located on each of the right side and the left side of the structure, the one or more joints allowing the structure to collapse into a substantially flat shape; and
   one or more support elements providing support for the top side of the structure, the one or more support elements comprising a first elongate shaft and a second elongate shaft, the first elongate shaft comprising a first end that is rotatably coupled to the bottom side, the second elongate shaft comprising a first end that is rotatably coupled to the bottom side at a location opposite of the location where the first end of the first elongate shaft is coupled to the bottom side, the first and second elongate shafts configured to rotate toward the top side at the first ends when the structure is un-collapsed such that second ends of the first and second elongate shafts are insertable into first and second support fasten mechanisms coupled to the top side.

2. The apparatus of claim 1, wherein the first elongate shaft is located proximate to the left side near the front side of the structure, and the second elongate shaft is located proximate to the right side near the front side of the structure.

3. The apparatus of claim 1, wherein the first support fasten mechanism and the second support fasten mechanism are located on the top side of the structure at locations opposite the locations where the first and second elongate shafts are coupled to the structure, the first and second support fasten mechanisms securing each of the first and second elongate shafts at a second end when the structure is un-collapsed.

4. The apparatus of claim 3, wherein the first and second support fasten mechanisms secure each of the first and second elongate shafts using one or more of a friction fit, a snap fit, and a magnet.

5. The apparatus of claim 1, further comprising a first retaining member and a second retaining member located on the bottom side of the structure, the first and second retaining members securing the first and second elongate shafts when the structure is collapsed.

6. The apparatus of claim 1, wherein the support elements further comprise first and second elongate shafts that are rotatably coupled to the top side of the structure at a first end.

7. The apparatus of claim 6, further comprising a first support fasten mechanism and a second support fasten mechanism located on the bottom side of the structure at locations opposite the locations where the first and second elongate shafts are coupled to the structure, the first and second support fasten mechanisms securing each of the first and second elongate shafts at a second end when the structure is un-collapsed.

8. The apparatus of claim 1, wherein the first and second elongate shafts comprise telescoping structures such that each of the first and second elongate shafts are extendable and collapsible.

9. The apparatus of claim 1, wherein the one or more support elements further comprise one or more joint support structures, the one or more joint support structures coupled to one or more joints located on the left and right sides of the structure.

10. The apparatus of claim 9, wherein a joint support structure comprises a first locking member coupled to a first half of a joint and a second locking member coupled to a second half of the joint corresponding to the first half of the joint, the first locking member engaging the second locking member to lock the joint in a fixed position in response to the structure being un-collapsed.

11. The apparatus of claim 1, wherein the one or more support elements are detachable from the structure.

12. A system comprising:
a power supply;
a substantially cube-shaped structure comprising a top side, a bottom side, a rear side, a left side, and a right side, wherein an inside of the structure is accessible through a front side of the structure, the front side being open;
one or more lighting elements disposed within the structure, the one or more lighting elements illuminating the inside of the structure and receiving power from the power supply;
one or more joints located on each of the right side and the left side of the structure, the one or more joints allowing the structure to collapse into a substantially flat shape; and
one or more support elements providing support for the top side of the structure, the one or more support elements comprising a first elongate shaft and a second elongate shaft, the first elongate shaft comprising a first end that is rotatably coupled to the bottom side, the second elongate shaft comprising a first end that is rotatably coupled to the bottom side at a location opposite of the location where the first end of the first elongate shaft is coupled to the bottom side, the first and second elongate shafts configured to rotate toward the top side at the first ends when the structure is un-collapsed such that second ends of the first and second elongate shafts are insertable into first and second support fasten mechanisms coupled to the top side.

13. The system of claim 12, wherein the first elongate shaft is located proximate to the left side near the front side of the structure, and the second elongate shaft is located proximate to the right side near the front side of the structure.

14. The system of claim 12, wherein the first support fasten mechanism and the second support fasten mechanism are located on the top side of the structure at locations opposite the locations where the first and second elongate shafts are coupled to the structure, the first and second support fasten mechanisms securing each of the first and second elongate shafts at a second end when the structure is un-collapsed.

15. The system of claim 12, wherein the one or more support elements further comprise one or more joint support structures, the one or more joint support structures coupled to one or more joints located on the left and right sides of the structure, and wherein a joint support structure comprises a first locking member coupled to a first half of a joint and a second locking member coupled to a second half of the joint corresponding to the first half of the joint, the first locking member engaging the second locking member to lock the joint in a fixed position in response to the structure being un-collapsed.

16. A method comprising:
providing a light box comprising:
a top side, a bottom side, a rear side, a left side, and a right side, wherein an inside of the structure is accessible through a front side of the structure, the front side being open;
one or more lighting elements disposed within the light box, the one or more lighting elements illuminating the inside of the light box and receiving power from a power supply;
one or more joints located on each of the right side and the left side of the light box, the one or more joints allowing the light box to collapse into a substantially flat shape; and
one or more support elements providing support for the top side of the structure, the one or more support elements comprising a first elongate shaft and a second elongate shaft, the first elongate shaft comprising a first end that is rotatably coupled to the bottom side, the second elongate shaft comprising a first end that is rotatably coupled to the bottom side at a location opposite of the location where the first end of the first elongate shaft is coupled to the bottom side, the first and second elongate shafts configured to rotate toward the top side at the first ends when the structure is un-collapsed such that second ends of the first and second elongate shafts are insertable into first and second support fasten mechanisms coupled to the top side;
un-collapsing the light box;
securing the one or more support elements; and
activating the one or more lighting elements.

* * * * *